A. S. HATHAWAY.
Mowing Machine.
No. 15,265.
Patented July 1, 1856.
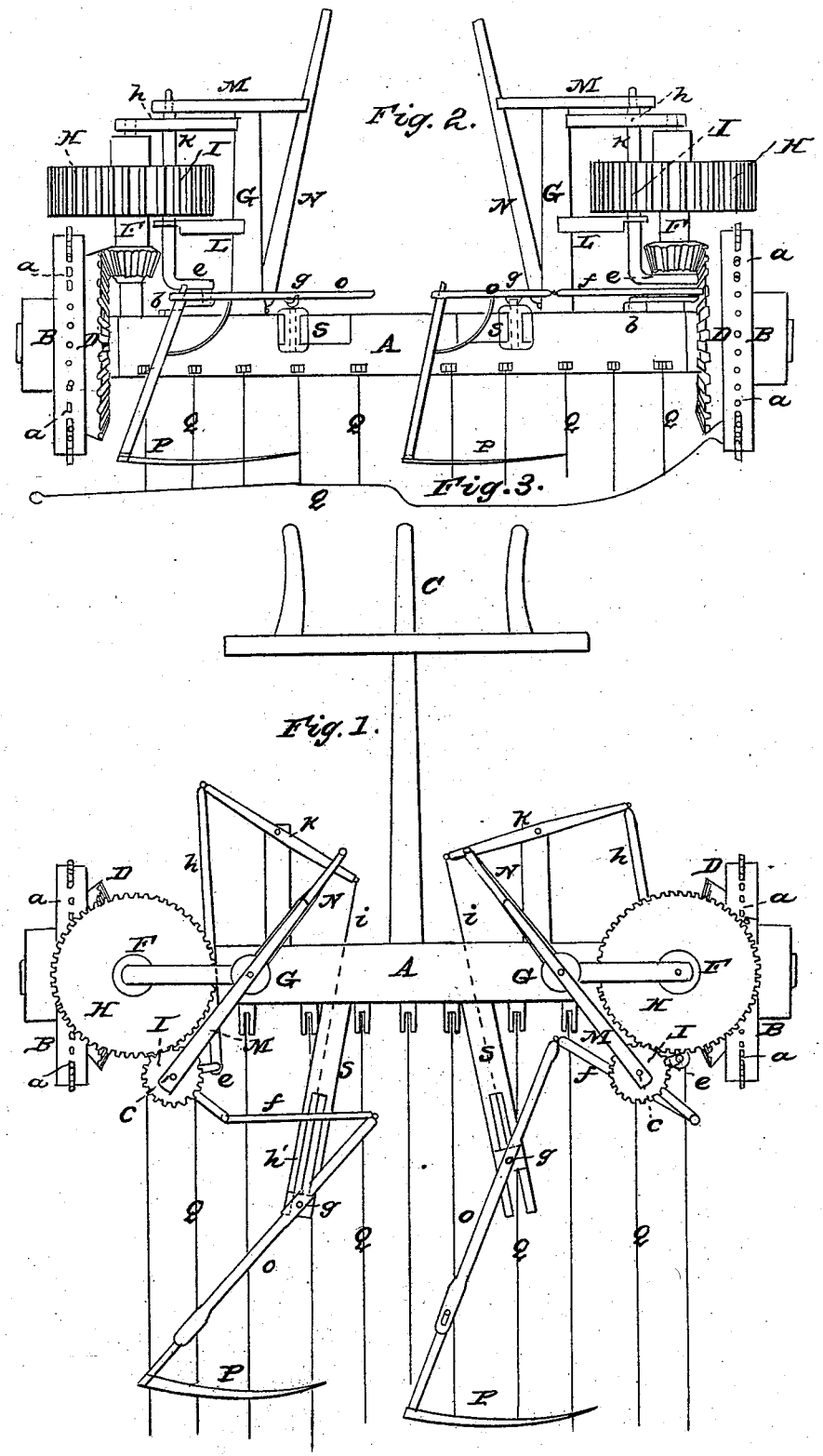

UNITED STATES PATENT OFFICE.

ANSON S. HATHAWAY, OF COLUMBIA, MAINE, ASSIGNOR TO HIMSELF AND FREDERICK A. RUGGLES, OF SAME PLACE.

IMPROVEMENT IN MACHINES FOR MOWING GRASS AND CUTTING GRAIN.

Specification forming part of Letters Patent No. 15,265, dated July 1, 1856.

*To all whom it may concern:*

Be it known that I, ANSON S. HATHAWAY, of Columbia, in the county of Washington and State of Maine, have invented an Improved Machine for Mowing Grass or Cutting Grain; and I do hereby declare that the same is fully described and represented in the following specification and the accompanying drawings, letters, figures, and references thereof.

Of such drawings, Figure 1 is a top view, and Fig. 2 a front elevation, of the said machine.

In these drawings, A exhibits a stout axle, carrying two wheels, B B, and having impelling shafts or contrivances applied, as seen at C, it being understood that the machine while in operation is to be pulled forward by horses or animals harnessed to the impelling-shafts. Each of the wheels B is provided with points or teeth extending from its periphery, as seen at $a\ a$, in order that when the machine is in motion its wheels may be sure to be rotated. Each of the wheels has fixed to its inner side a beveled gear, D, which engages with a beveled pinion fixed on a vertical shaft, F, suitably supported by means of journals working in the axle and in an arm, $b$, from an upright post elevated on the said axle-tree. Each of the shafts carries a spur-gear, H, which engages with and drives a pinion, I, affixed upon a shaft, K. The said shaft extends through an arm, L, which projects from the post G, the said shaft being so applied to the said arm as to be capable of rotating freely on the same, and of being moved either toward or away from the shaft F, so as to throw the pinion I either into or out of gear with the wheel H, as occasion may require. The upper journal, $c$, extends through and works in one end of a horizontal lever, M, which has its fulcrum at the top of the post G, and is so jointed or applied to an inclined hand-lever, N, as to be capable of being moved by power applied thereto. That part of each shaft K which is below its arm L carries a bell-crank, $b$, and a straight crank, $e$, as seen in Fig. 2. The bell-crank has a connecting-rod, $f$, extending from it and jointed to the rear end of a long lever, O, to whose opposite end a common scythe, P, is affixed and made to project therefrom, as seen in the drawings, the back of the blade of the scythe resting upon a series of long rods, Q Q, arranged as seen in Fig. 1. The rear end of each of the said rods is jointed to the axle-tree in such manner as to permit the whole arm to turn or play freely, either upward or downward, as occasion may require. Each of the said rods has its front end bent or curved upward, in order that the rod may pass freely over the ground while resting upon it. The fulcrum of each lever O is so adapted to a supporting strut or arm, S, projecting from the axle, as seen in Fig. 1, as to be capable of sliding or moving longitudinally thereon, such movement being produced by means of two connecting-rods, $h\ i$, and a lever $k$, arranged as seen in Fig. 1, and operated by means of the lower crank of an upright shaft, K.

From the above it will be seen that when either shaft K is put in rotation not only will a horizontal motion be imparted to its lever O upon the fulcrum of the same, but such fulcrum and such lever will at the same time be put in motion longitudinally of said shaft, whereby the scythe will have imparted to it motions corresponding very nearly to those which are given to such implement when used in the hands of a farmer.

In the drawings one scythe is exhibited somewhat in rear of the other, in order that the rear scythe may be sure to pass over and cut any grass which may be left uncut by the front scythe while the machine is in operation.

In Fig. 3 I have represented one of the guard-rods Q in side view. The grass as it is cut falls between the guard-rods which are moved through it, and as the scythes rest on them they are kept down to the surface of the ground. The outer end of the scythe should be curved or bent so as not to work or pass under any of the guard-rods. When the grass is cut it falls from the scythes and in swaths, as in ordinary mowing by hand.

Having thus described my machine, what I claim is as follows:

The scythes P P, when arranged in relation to each other and operated by mechanism constructed and arranged as above described, in combination with the peculiarly-constructed and independent-acting guards Q Q, operating substantially in the manner and for the purpose set forth.

ANSON S. HATHAWAY.

Witnesses:
JOSEPH CRANDON,
JOHN H. CRANDON.